Figure 1:
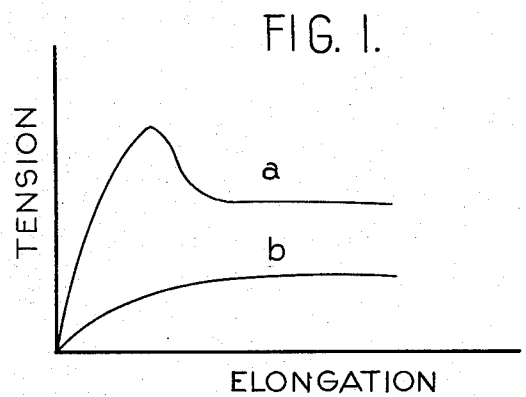

United States Patent Office 2,961,711
Patented Nov. 29, 1960

2,961,711

PROCESS FOR STRENGTHENING HOLLOW BODIES OF PLASTIC MATERIAL

Georg Diedrich, Neuenhain (Taunus), Kurt Richard, Bad Soden (Taunus), and Erwin Gaube, Kelsterbach (Main), Germany, assignors to Farbwerke Hoechst Aktiengesellschaft vormals Meister Lucius & Brüning, Frankfurt am Main, Germany, a corporation of Germany Filed Sept. 3, 1957, Ser. No. 681,764

Claims priority, application Germany Sept. 6, 1956

3 Claims. (Cl. 18—48)

The present invention relates to a process for the manufacture of strengthened hollow bodies of polyolefins by expansion and subsequent cooling.

It is known that the mechanical properties of thermoplasts can be improved by stretching the material in the thermoplastic temperature range. By a treatment of this kind brittle polystyrene, for example, becomes viscous, polyvinyl chloride becomes more viscous and the strength is improved in the stretching direction.

Many processes are based on this phenomenon, for example the stretching of chemical fibers or the improvement of the tenacity and strength of tubes or other hollow bodies by inflation in the thermoplastic temperature range.

When stretching plastics in many cases a local necking occurs (so-called neck formation) which, once formed proceeds over the whole length of the test bar. The test bar stretched in this manner then possesses the desired improved mechanical properties. In the tension-elongation diagram the neck formation is expressed by a decrease and subsequent remaining constant for a more or less prolonged time of the tensile strength (cf. Figure 1, curve $a$). When stretching fibers, or generally when stretching bar-shaped specimen in one direction the neck formation does not cause troubles.

Hollow bodies can, however, be expanded or inflated without trouble only in case the neck formation is avoided. Otherwise the expansion does not take place uniformly over the entire cross section and local bubbles are formed which tear open when increasing the pressure.

Many thermoplasts, for example polystyrene and polyvinyl chloride tend to neck formation only at lower temperatures which already disappears when moderately increasing the temperature. In the latter case the tension-elongation curve corresponds to the course of curve $b$ in Figure 1 without any maximum. Tubes of plastics of this kind can be expanded without difficulty to attain a sufficient orientation or strengthening.

In another class of plastics, for example polyethylene and structurally and mechanically related polymer products the neck formation only disappears at considerably higher temperatures, for example in the case of low pressure polyethylene at the crystallite melting point which is situated according to the degree of polymerization between 125 and 128° C. For this reason bottles, shaped articles and foils of said polyethylene are produced according to the blowing process at temperatures above the range mentioned. This method of working involves the inconvenience that at the indicated temperatures the strength of the material is not or only slightly improved.

Now we have found that strengthened tubes and other hollow bodies of polyolefins or structurally and mechanically related polymer products according to the blowing process are obtained when the expansion is carried out at temperatures at which a neck formation is just avoided.

Figure 2:
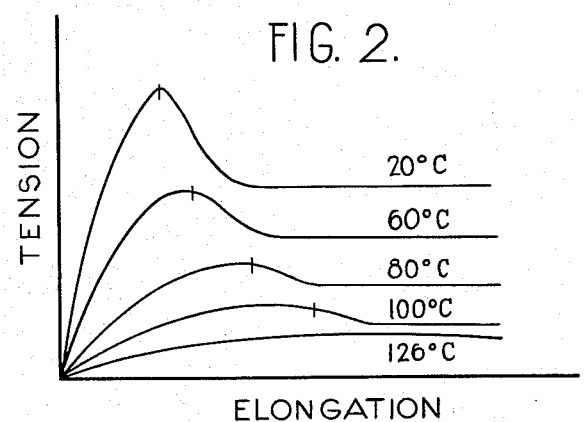

Said temperature can be determined for each plastic in a simple manner by establishing tension-elongation curves for several test bars of the plastic material at different temperatures. The temperature at which the course of curve $a$ changes into the course of curve $b$ is chosen as working temperature for the process according to the invention (i.e. in the tension-elongation diagram no maximum must appear). In the diagram of Figure 2 there are shown the tension-elongation values of various test bars of low pressure polyethylene prepared according to the Ziegler process (Angew. Chemie, 67 (1955), 541).

Figure 3:
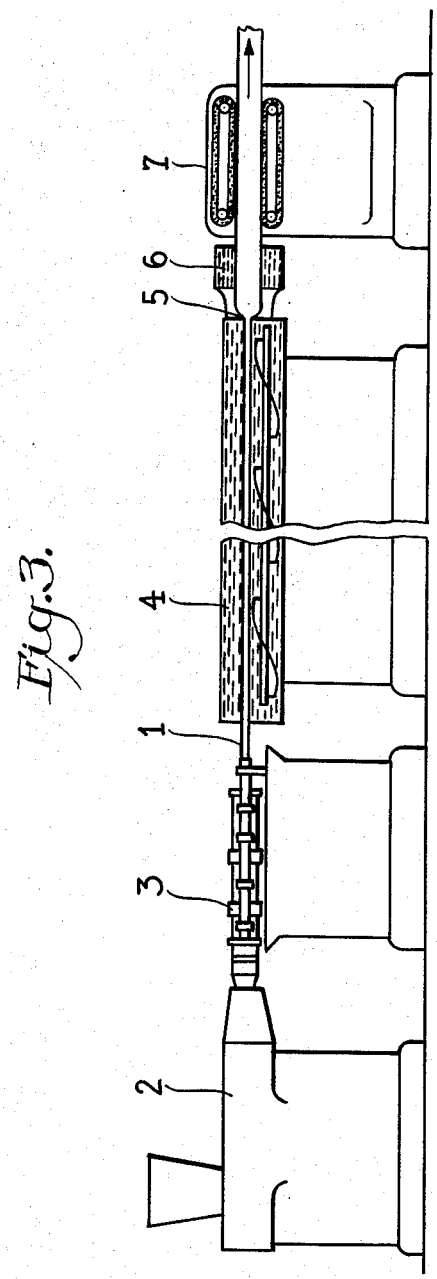

In the drawings, Figure 1 illustrates the two characteristic forms of tension elongation curves of plastic material; Figure 2 shows the form of tension elongation curves depending upon the temperature for low pressure polyethylene prepared according to the Ziegler process; Figure 3 shows diagrammatically the performance of the instant process comprising the extrusion of a tube, its tempering, and its expanding. In this figure, a plastic tube 1 produced from an extruder 2 is calibrated and cooled by a combination calibration and cooling device 3 to a temperature below the crystallite melting point of the plastic material. The tube is then reheated in heating bath 4 to a temperature at which the expansion is intended to occur, expanded at 5, cooled at 6, and withdrawn by drawing-off mechanism 7. In some cases, it is advisable to install another draw-off device between the calibration and cooling means 3 and the heating bath 4 in order to effect proper transportation of the tube through the apparatus.

The temperature range at which low pressure polyethylene can be expanded according to the process of the invention is situated for example between 126 and 128° C. Said range can vary by a few degrees according to the charge of the material used for the production. Low pressure polypropylene can be expanded according to the process of the invention for example at temperatures between about 135 and 165° C. The temperature at which the hollow bodies are expanded according to the process of the invention is limited on the one hand by the temperature at which a neck formation is just avoided and on the other hand by the temperature of the crystallite melting point.

The process according to the invention can be carried out continuously or discontinuously. In case single tube pieces shall be expanded and strengthened, they are heated in a heating device to the temperature required according to the process of the invention. The pieces are then conducted into the interior space of a cylindrical condenser jacket having a definite inside diameter and expanded, for example by means of internal pressure, until the expanded and strengthened tube sits closely to the interior wall of the condenser jacket.

Another variant of the process according to the invention consists in cooling the tubes or hollow bodies leaving the extruder in a thermoplastic state in cooling devices to the working temperature according to the process of the invention and then expanding them in the manner described above. On account of the supercooling effect occuring crystallization may take place at a temperature slightly below the crystallite melting point observed when heating the cold material. In this case it is therefore necessary to reduce the working temperature accordingly. Naturally it is likewise possible first to cool the objects leaving the extruder to a temperature below the expanding temperature, then to heat them again to said temperature and to continue the treatment as described above.

The heating devices used in the known blowing processes are likewise suitable for the process according to the invention. But when carrying out the latter process it is necessary considerably to improve the devices with regard to their regulability and uniformity of temperatures.

Plastic materials which can be processed according to the present invention are, for example, polyethylene, preferably low pressure polyethylene, polypropylene prepared according to the low pressure process, copolymers of ethylene and propylene and polymer mixtures of the polymers mentioned with one another or with other polymers, for example polyvinyl chloride. It is especially suitable to use polyolefins prepared according to known low pressure processes (Ziegler). It is likewise possible, of course, to use after-chlorinated polyolefins.

According to the process of the invention any degree of expansion can be attained to form tubes or to strengthen said tubes.

The tubes or hollow bodies strengthened according to the process of the invention not only possess a higher bursting pressure but also a considerably higher durability in a given time against internal pressure stress. Furthermore the tension crack formation occurring in some plastics at higher temperatures is largely suppressed.

The following examples serve to illustrate the invention but they are not intended to limit it thereto.

*Example 1*

A tube of low pressure polyethylene having an outside diameter of 32 mm. and a wall thickness of 4 mm. is heated to exactly 126° C. and expanded by internal pressure against a cylindrical cooling jacket (20° C.) having an inside diameter of 65 mm. The expansion takes place in a flat-conical contact piece; longitudinal stretching is avoided by introducing and removing the tube at the same speed. The tube thus obtained has a wall thickness of about 2 mm., a strength of 400 kg./cm.$^2$ in circumferential direction and an about unchanged strength in longitudinal direction (200 kg./cm.$^2$). By the expansion the strength in circumferential direction is therefore improved by 100%.

*Example 2*

A piece of tube of low pressure polyethylene having an outside diameter of 32 mm., a wall thickness of 4 mm. and a strength of 220 kg./cm.$^2$ is expanded under the conditions described in Example 1, the expansion taking place, however, not in a conical but in a hemispherical manner. By that the speed at which the tube is withdrawn is somewhat increased whereby, in addition to a circumferential stretching also a longitudinal stretching is brought about. The wall of the tube thus obtained has a thickness of about 1 mm. and the strength amounts to about 400 kg./cm.$^2$ in both directions.

*Example 3*

A tube piece having the same dimensions as in Example 1 and being produced of a polymer mixture of polyvinyl chloride and chlorinated low pressure polyethylene is expanded at 65° C. as described in Example 1, whereby the strength increases to 600 kg./cm.$^2$ in circumferential direction whereas the strength in longitudinal direction remains nearly unchanged (300 kg./cm.$^2$).

We claim:

1. In a process wherein a plastic tubing composed of a polymer of a lower monoolefin is expanded by internal pressure so as to stretch the tubing both circumferentially and longitudinally, with a resulting increase in its mechanical strength, said stretching tending to cause neck formation in the tubing with the result that non-uniform expansion occurs and local bubbles are formed, the improvement comprising cooling the tubing as it leaves the extruder in a thermoplastic state to a temperature below the crystallite melting point, and then reheating the tube near its crystallite melting point but not above said crystallite melting point, and expanding it at this temperature, this temperature being determined by performing a test to establish the minimum temperature at which necking disappears in the stretching of a sample, whereby uniform stretching of the tubing is effected without neck formation, and orientation and strengthening of the tube is thereby effected.

2. In a process wherein a plastic tubing composed of low pressure polyethylene is expanded by internal pressure so as to stretch the tubing, both circumferentially and longitudinally, with a resulting increase in its mechanical strength, said stretching tending to cause neck formation in the tubing with the result that non-uniform expansion occurs and local bubbles are formed, the improvement comprising cooling the tubing as it leaves the extruder in a thermoplastic state to a temperature below the crystallite melting point, and then reheating the tube to 126–128° C. and expanding it at this temperature, whereby uniform stretching of the tubing is effected without neck formation, and orientation and strengthening of the tube is thereby effected.

3. In a process wherein a plastic tubing composed of low pressure polypropylene is expanded by internal pressure so as to stretch the tubing, both circumferentially and longitudinally, with a resulting increase in its mechanical strength, said stretching tending to cause neck formation in the tubing with the result that non-uniform expansion occurs and local bubbles are formed, the improvement comprising cooling the tubing as it leaves the extruder in a thermoplastic state to a temperature below the crystallite melting point, and then reheating the tube to a temperature between 135 and 165° C. and expanding it at this temperature, whereby uniform stretching of the tubing is effected without neck formation, and orientation and strengthening of the tube is thereby effected.

References Cited in the file of this patent

UNITED STATES PATENTS

| | | |
|---|---|---|
| 2,641,022 | Kress | July 9, 1953 |
| 2,668,323 | Johnson | Feb. 9, 1954 |
| 2,763,029 | Tulloss | Sept. 18, 1956 |
| 2,774,993 | Hagen et al. | Dec. 25, 1956 |